United States Patent
Bice et al.

[15] 3,659,458
[45] May 2, 1972

[54] SIGHT GAUGE
[72] Inventors: William A. Bice; Michael W. Riddle, both of Lubbock, Tex.
[73] Assignee: Clark Equipment Company
[22] Filed: Oct. 28, 1970
[21] Appl. No.: 84,689

[52] U.S. Cl.................................73/306, 73/322, 73/328
[51] Int. Cl............................G01f 23/02, G01f 23/06
[58] Field of Search..............73/306, 307, 319, 322, 291, 73/328

[56] References Cited

UNITED STATES PATENTS

| | | | |
|---|---|---|---|
| 1,710,474 | 4/1929 | Dodd | 73/291 X |
| 2,840,034 | 6/1958 | Danias | 73/307 X |
| 3,483,656 | 12/1969 | Baumann | 73/322 |

Primary Examiner—Louis R. Prince
Assistant Examiner—Daniel M. Yasich
Attorney—Kenneth C. Witt, John C. Wiessler, Robert H. Johnson and Lewis J. Lamm

[57] ABSTRACT

A sight gauge assembly for vertically superimposed tanks in communication with each other including a transparent sight tube communicating with the tanks and disposed alongside of the upper tank to indicate liquid level therein and a float member movable in the sight tube and extending into the lower tank for indicating the lever of liquid in the lower tank when observing the position of the float member in the sight tube.

5 Claims, 5 Drawing Figures

INVENTORS
WILLIAM A. BICE
MICHAEL W. RIDDLE

BY Kenneth C. Witt
ATTORNEY

SIGHT GAUGE

BACKGROUND OF THE INVENTION

1. Field of the Invention

The present invention generally relates to the provision of a sight gauge assembly for dual tanks for fuel or other liquid to indicate the level of liquid in the tanks by observing a single sight tube.

2. Description of the Prior Art

Other types of sight gauges have been provided to indicate the level of liquid in a tank with a simple sight tube being extensively used in various fields. When dual tanks are employed, it is conventional to provide two independent gauges thus requiring observation of both gauges to obtain determination of the liquid level in the tanks.

SUMMARY OF THE INVENTION

An object of the present invention is to provide a sight gauge assembly for superimposed communicating dual tanks which includes a single sight tube disposed alongside of the upper tank and a movable float member disposed in the sight tube and extending into the lower tank for indicating the liquid level in the lower tank after the upper tank has been emptied.

Another object of the invention is to provide a sight gauge assembly which includes a vent to enable entrapped air in the lower tank to be discharged into the upper end of the upper tank and then to the atmosphere through a vent cap thereon.

A further object of this invention is to provide a sight gauge assembly which is simple in construction, dependable and long lasting and relatively inexpensive to manufacture.

DESCRIPTION OF THE PREFERRED EMBODIMENT

Figure 1:
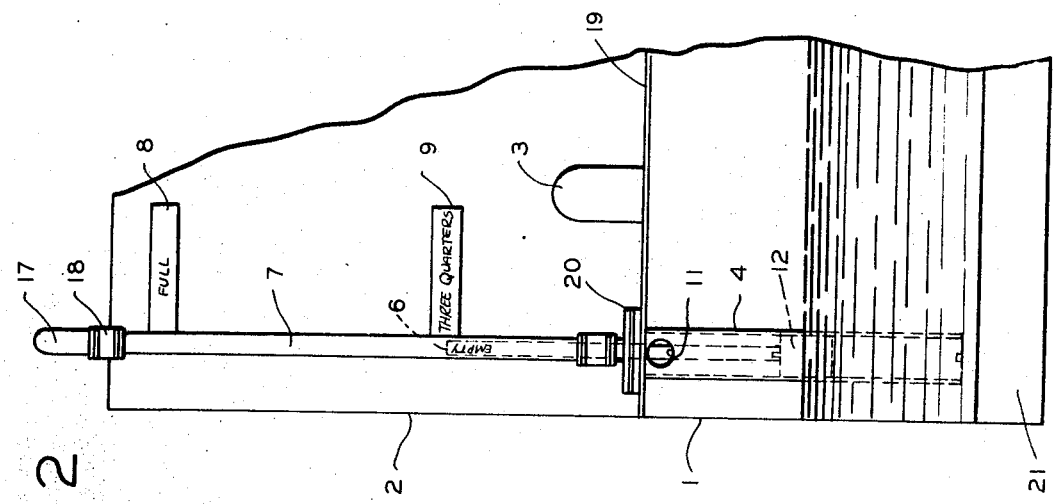
FIG. 1 is a side elevational view of the dual tank and sight gauge with the upper tank empty and the lower tank practically empty.

Referring now specifically to the drawing, the sight gauge assembly is associated with dual tanks including a lower tank 1 and an upper tank 2 communicating therewith through a connecting pipe 3. The upper tank 2 has a removable and vented filler cap 10 through which both tanks are filled.

A vertically disposed sight tube 7 of transparent material extends alongside of the upper tank 2 and communicates with the top thereof through a tube 17 and a fluid tight connector 18. The lower end of the sight tube 7 is connected with the top wall 19 of the bottom tank 1 by an adapter fitting 20 and includes a metal tube extension 4 that extends downwardly into the bottom tank 1 and terminates adjacent the bottom wall 21 thereof.

A float member 12 is movably disposed in the extension 4 and an upward extension 5 on the float member 12 which may be transparent also, like sight tube 7, if desired, extends upwardly into sight tube 7.

At the bottom of tube 4, stops 4a are provided for the float 12, and when both of the tanks are empty, or almost empty as indicated in FIG. 1 (with the liquid level below the end of tube 4) the float 12 rests on stops 4a.

Figure 2:
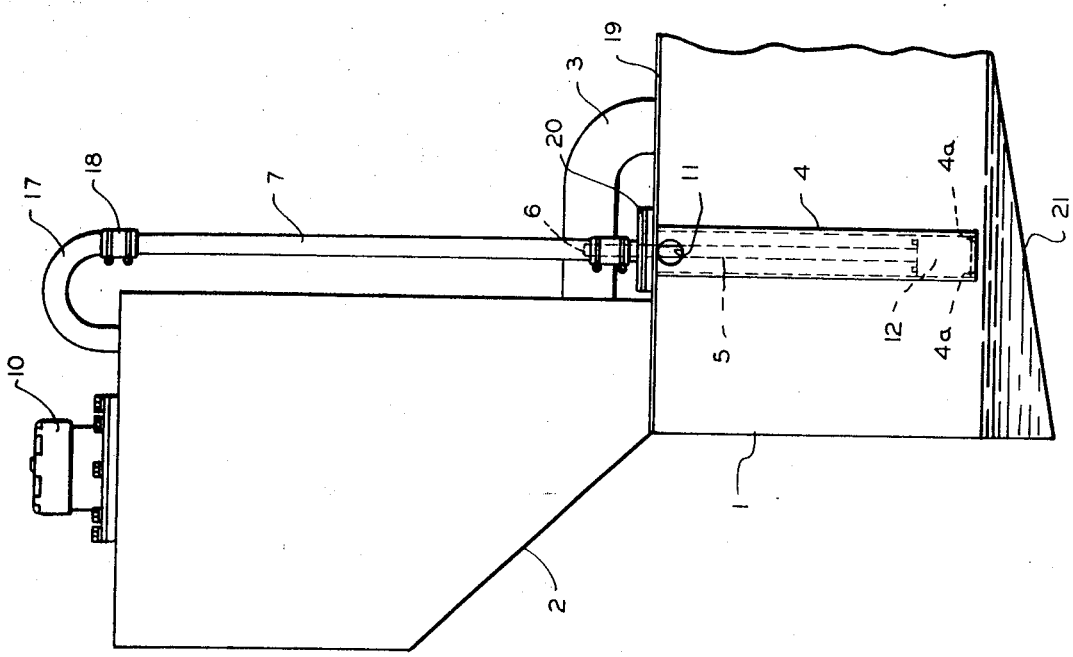
FIG. 2 is an end view of the sight gauge showing the lower tank partially filled.

When the bottom tank is partially filled as indicated in FIG. 2, the float rises to the position indicated in that figure. Upward extension 5 also rises, of course, and if desired, indicia indicating the amount of liquid in the dual tank assembly may be indicated on extension 5. If extension 5 is of transparent material such indicia can conveniently be on the inside surface of or within extension 5 as shown at 6 in FIG. 2. Additional indicia 8 and 9 cooperate with the liquid level in tube 7 as the amount of liquid in the dual tanks increases to indicate such amount.

Figure 4:
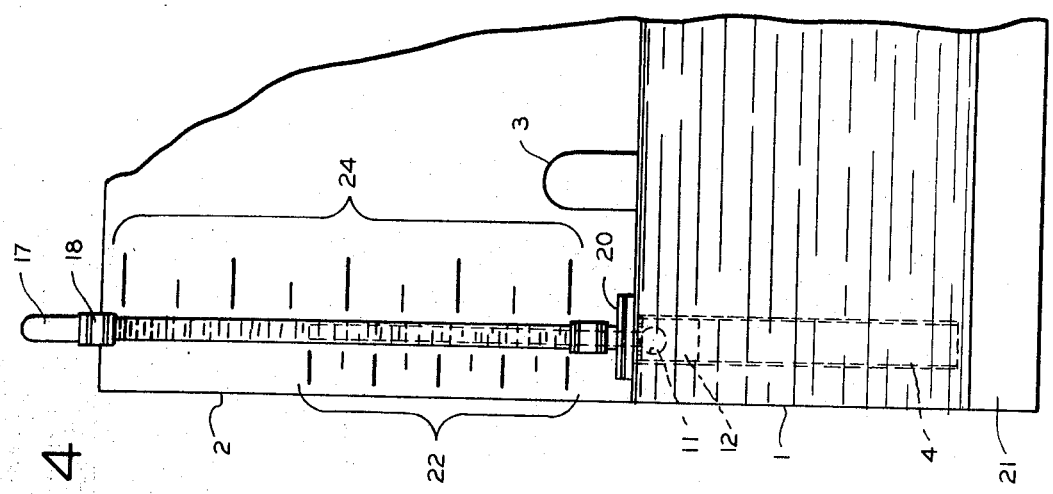
FIG. 4 is an end view of the assembly showing both tanks full.

As an alternative, it is possible to utilize indicia indicated generally by the numerals 22 and 24 which appear along the left and right sides of tube 7 in FIG. 4. These can be merely short lines as indicated in these figures, or it is possible to use words such as empty, half full, full, etc. In any event, these indicia can be arranged so that they indicate the amount of liquid in the tanks individually or combined. The indicia on the left cooperate with the top of extension 5 to indicate the liquid level in tank 1, while the indicia on the right cooperate with the top of the liquid in tube 7 to indicate the liquid level in tank 2.

Figure 3:
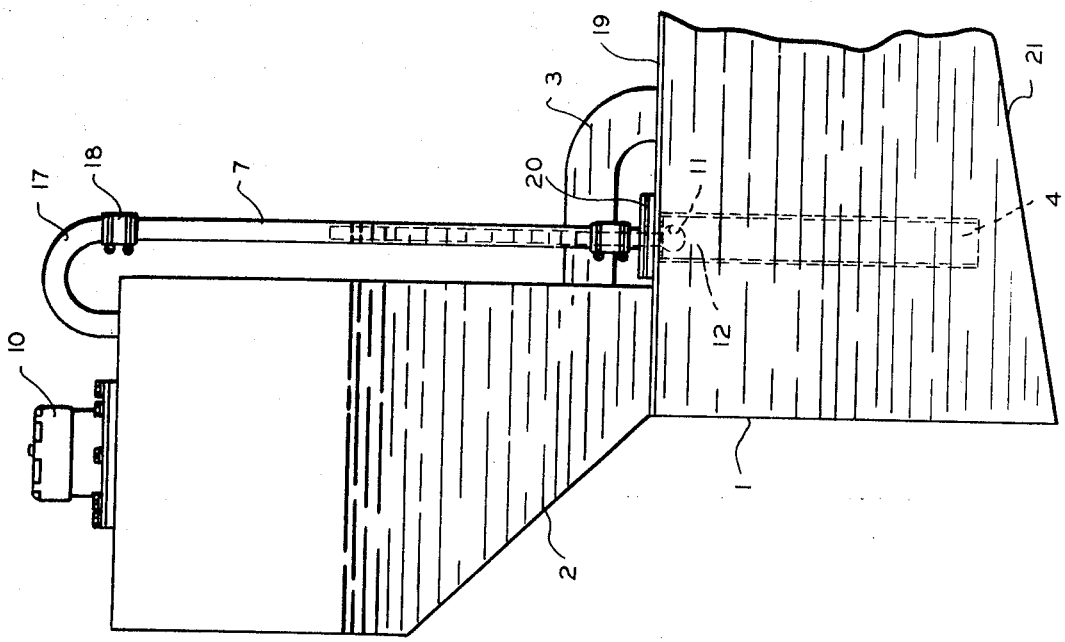
FIG. 3 is a side elevation of the tank and sight gauge showing the lower tank full and the upper tank partially full.

FIG. 3 of the drawing shows the two tanks in a condition in which the bottom tank is completely filled and the top tank is partly filled. Under these circumstances, liquid rises in sight tube 7 and since this tube is transparent, the liquid is visible to indicate the liquid level in the upper tank. Float 12 abuts the top 19 of tank 1.

FIG. 4, in addition to showing an alternative arrangement for the indicia, also shows the sight gauge in the condition in which both tanks are filled. Float 12 continues to abut the top 19 of the lower tank and the liquid in tube 7 completely fills such tube.

Figure 5:
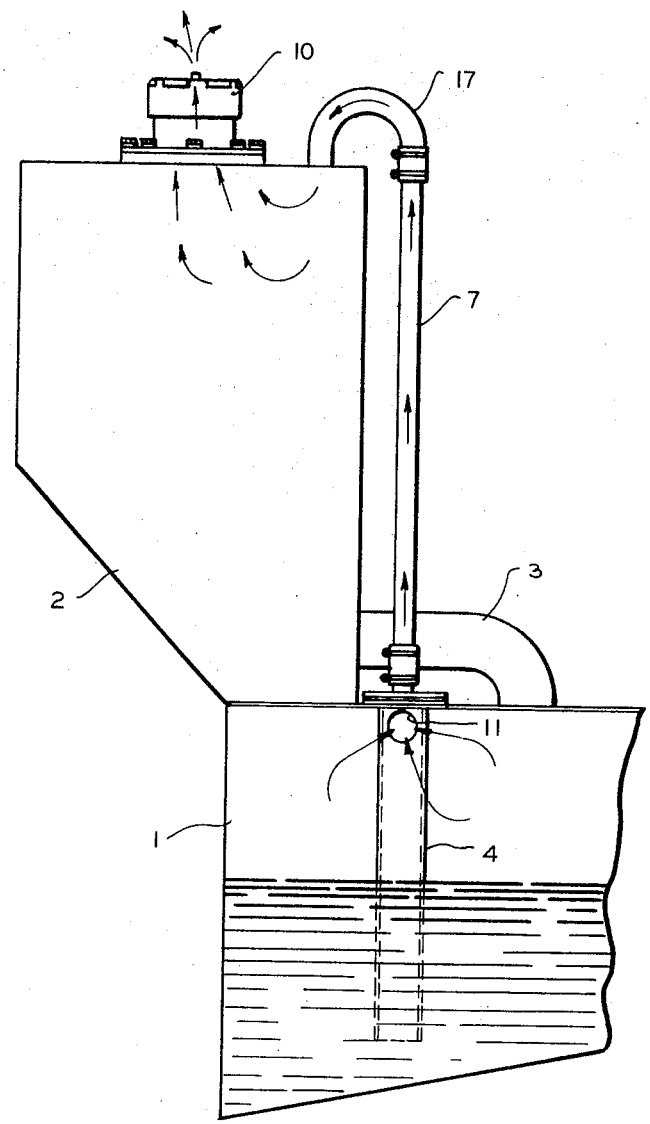
FIG. 5 is a side elevation showing the air vent feature of the sight gauge.

As the tanks are being filled, air may be trapped in the lower tank. This entrapped air may be vented through a hole 11 provided near the top of tube 4 and then up through sight tube 7 into the upper tank 2 and out through the vented cap 10, as shown schematically in FIG. 5.

It will be apparent that the embodiments shown are only exemplary and that various modifications can be made in construction, materials and arrangement within the scope of the invention as defined in the appended claims:

We claim:

1. A sight gauge for interconnected vertically displaced dual tanks to indicate the level of liquid in the tanks, comprising a sight tube extending from the top portion of the upper tank to the top of the lower tank to enable visual observation of the level of liquid in the upper tank until the level of liquid in the upper tank drops below the bottom of the upper tank, a guide tube in lower tank defining an extension of the sight tube, an elongated float member movably disposed in said guide tube, said float member having an upper end portion received in said sight tube and being movable in response to variation in the level of liquid in the lower tank thereby enabling visual observation of the upper end portion of the float member for indicating the level of liquid in the lower tank.

2. The assembly as defined in claim 1 wherein said upper tank includes a vented cap, said guide tube having air vent means therein adjacent the top of the lower tank to vent entrapped air from the top of the lower tank through the sight tube into the top portion of the upper tank and out through the vented cap.

3. The assembly as defined in claim 1 wherein the upper tank has indicia means thereon alongside the sight tube for indicating the level of liquid in the tanks.

4. The assembly as defined in claim 1 wherein said float member includes indicia means thereon to indicate the level of liquid in the lower tank.

5. The assembly as defined in claim 4 wherein the float member is transparent to enable optimum observation of the float member and sight tube and the indicia means associated therewith.

* * * * *